United States Patent
Araujo et al.

(10) Patent No.: US 10,683,232 B2
(45) Date of Patent: Jun. 16, 2020

(54) PHOTOCHROMIC GLASS WITH SHARP CUTOFF

(71) Applicant: Corning Incorporated, Corning, NY (US)

(72) Inventors: Roger Jerome Araujo, Horseheads, NY (US); Nicholas Francis Borrelli, Elmira, NY (US); Nadja Teresia Lönnroth, Corning, NY (US); David Lathrop Morse, Corning, NY (US); Thomas Philip Seward, III, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/121,920

(22) Filed: Sep. 5, 2018

(65) Prior Publication Data

US 2019/0002335 A1    Jan. 3, 2019

Related U.S. Application Data

(62) Division of application No. 15/354,470, filed on Nov. 17, 2016, now Pat. No. 10,150,692.

(Continued)

(51) Int. Cl.
  *C03C 3/11*    (2006.01)
  *C03C 14/00*    (2006.01)
  (Continued)

(52) U.S. Cl.
  CPC ........... *C03C 3/11* (2013.01); *C03C 4/065* (2013.01); *C03C 4/085* (2013.01); *C03C 14/006* (2013.01);
  (Continued)

(58) Field of Classification Search
  CPC ........... C03B 23/0256; C03B 23/0302; C03B 23/0307; C03B 23/007; C03C 3/091;
  (Continued)

(56) References Cited

U.S. PATENT DOCUMENTS 3,197,296 A    7/1965  Eppler et al.
3,208,860 A    9/1965  Armistead et al.
(Continued)

FOREIGN PATENT DOCUMENTS

EP    0041789 A1    5/1981
EP    0579945 A1    6/1993
(Continued)

OTHER PUBLICATIONS

A. N. Babkina et al., The Effect of Temperature on the Exciton Absorption of Copper Chloride and Copper Bromide Nanocrystals in Potassium-Aluminum-Borate Glass, Glass physics and chemistry, 41(1), 2015.

(Continued)

*Primary Examiner* — Noah S Wiese
(74) *Attorney, Agent, or Firm* — Kevin L. Bray

(57) ABSTRACT

A photochromic glass that includes a base glass and a photochromic agent is described. The base glass is a modified boroaluminosilicate glass and the photochromic agent is a nanocrystalline cuprous halide phase. The photochromic glass exhibits a sharp cutoff in the UV or short wavelength visible portion of the spectrum along with an absorption band at longer wavelengths in the visible. The nanocrystalline cuprous halide phase includes $Cu^{2+}$, which provides states within the bandgap of the cuprous halide that permit the glass to absorb visible light. Absorption of visible light drives a photochromic transition without compromising the sharp cutoff. The nanocrystalline cuprous halide phase may optionally include Ag.

31 Claims, 9 Drawing Sheets

Related U.S. Application Data

(60) Provisional application No. 62/269,285, filed on Dec. 18, 2015.

(51) Int. Cl.
*C03C 4/06* (2006.01)
*C03C 4/08* (2006.01)
*G02B 5/22* (2006.01)
*G02B 5/23* (2006.01)

(52) U.S. Cl.
CPC ............... *G02B 5/226* (2013.01); *G02B 5/23* (2013.01); *C03C 2204/00* (2013.01)

(58) Field of Classification Search
CPC .......... C03C 3/11; C03C 4/085; C03C 4/065; C03C 14/006; G02B 5/3025; G02B 5/23
See application file for complete search history.

(56) References Cited

U.S. PATENT DOCUMENTS

| | | |
|---|---|---|
| 3,325,299 A | 6/1967 | Araujo |
| 3,954,485 A | 5/1976 | Seward, III et al. |
| 4,166,745 A | 9/1979 | Araujo et al. |
| 4,222,781 A | 9/1980 | Morse et al. |
| 5,281,562 A | 1/1994 | Araujo et al. |
| 5,322,819 A | 6/1994 | Araujo et al. |
| 5,430,573 A | 7/1995 | Araujo et al. |
| 5,625,427 A * | 4/1997 | Araujo ................ C03B 23/0256 351/159.01 |
| 5,925,468 A | 7/1999 | Stewart |
| 5,932,501 A | 8/1999 | Brocheton |
| 7,618,908 B2 * | 11/2009 | Borrelli ................... C03B 32/00 359/487.06 |
| 8,179,595 B2 * | 5/2012 | Borrelli ................ C03B 23/047 359/361 |

FOREIGN PATENT DOCUMENTS

| | | |
|---|---|---|
| EP | 0698583 A2 | 2/1996 |
| EP | 0722910 A1 | 7/1996 |
| WO | 1997030947 A1 | 8/1997 |

OTHER PUBLICATIONS

International Search Report and Written Opinion PCT/US2016/0696247 dated Jul. 13, 2017.
N. Borrelli et al, Optical properties of stretched CuClBr-containing glasses, Proceedings of SPIE—The International Society for Optical Engineering, 1994.
R. Araujo, Influence of boron-oxygen bonding on glass properties, Journal of Non-Crystalline Solids, vol. 222, Dec. 11, 1997, pp. 25-32.
R. Araujo, Precipitation of cuprous halides in borosilicate glasses, Proceedings of SPIE—The International Society for Optical Engineering, vol. 2287, 1994, pp. 144-153.
R. Araujo, Influence of host glass on precipitation of cuprous halides, Journal of Non-Crystalline Solids, vol. 223, Issue 1-2, Jan. 1, 1998, pp. 53-56.
V. V. Golubkov et al., Precipitation of Nanosized Crystals CuBr and CuCl in Potassium Aluminoborate Glasses, Glass Physics and Chemistry, 2012, vol. 38, No. 3, pp. 259-268.
M. I. Vasil'ev et al., The Influence of Potassium Bromide on the Properties of Nanocrystalline Copper Halide Particles in Sodium Aluminoborosilicate Glasses, Glass Physics and Chemistry, vol. 28, No. 5, 2002, pp. 288-295.

* cited by examiner (b)

PHOTOCHROMIC GLASS WITH SHARP CUTOFF

RELATED APPLICATION INFORMATION

This application is a divisional of U.S. application Ser. No. 15/354,470, filed Nov. 17, 2016, which claims priority under 35 U.S.C. § 119 of U.S. Provisional Application Ser. No. 62/269,285 filed on Dec. 18, 2015, the contents of which are relied upon and incorporated herein by reference in their entirety.

FIELD

This description pertains to photochromic materials. More particularly, this description pertains to photochromic glass with strong absorption of light in the UV or short wavelength visible portions of the spectrum. Most particularly, this description pertains to photochromic glass having a sharp absorption feature near 400 nm and a photochromic response capable of being initiated by visible light.

BACKGROUND

Photochromic glass has been widely used in the field of ophthalmic lenses with a particular emphasis on applications to sunglasses. Upon exposure to actinic radiation, a photochromic glass undergoes a photochemical or photostructural transformation that leads to darkening and a reduction in the transmission of light in a particular spectral range. In the case of sunglasses, the actinic radiation may be sunlight and the photochromic response may lead to a reduction in transmission of visible light to reduce the intensity of light that reaches the eye. The photochromic response protects the eye from unsafe intensity levels and provides comfort to the wearer.

The earliest commercially successful photochromic glasses utilized silver halide crystals as the photochromic agent. The silver halides can be incorporated into a variety of base glasses to provide a photochromic glass suitable for ophthalmic uses. Typical base glasses are alkali-doped silica or modified silica glasses. U.S. Pat. No. 3,208,860 (Armistead and Stookey) and U.S. Pat. No. 3,197,296 (Eppler and Stookey), for example, describe photochromic glasses that include silver halides in an alkali-doped boroaluminosilicate glass. Silver halide photochromic glasses remain a viable commercial product and are sold by Corning, Inc. under the PHOTOGRAY® and PHOTOBROWN® product lines.

Silver halides have certain drawback as photochromic agents. First, silver halides have high sensitivity to actinic radiation and impart a strong photodarkening response when exposed to low levels of actinic radiation. As a result, a viewer wearing sunglasses made from silver halide photochromic glass perceives little difference in the level of darkening observed at low (e.g. dawn) and high (e.g. midday) levels of illumination. It would be desirable to develop a photochromic glass that exhibits a more uniform photodarkening response, as perceived by the viewer, over the range of illumination intensities normally encountered in daily activity. Second, the photodarkening response of silver halide glasses is sensitive to ambient temperature. For a given level of illumination, photodarkening is more pronounced at low temperatures than at high temperatures. This leads to seasonal variations in the photochromic response that may be undesirable for many consumers. Third, silver is a relative expensive additive for glass and the cost of silver halide photochromic glass limits the range of commercial applications.

Deficiencies in the performance and cost of silver halide glasses have motivated interest in developing silver-free photochromic glasses for commercial applications. U.S. Pat. No. 3,325,299 (Araujo); U.S. Pat. No. 3,954,485 (Seward and Tick); and U.S. Pat. No. 4,166,745 (Araujo and Tick) describe a series of photochromic glasses that use copper-cadmium halides as the photochromic agent. The copper-cadmium halides exhibit good photochromic response and overcome many of the deficiencies associated with silver halides: (1) batch cost is reduced by eliminating silver, (2) the photochromic response is less sensitive to ambient temperature, and (3) a photodarkening response that varies more gradually with illumination intensity. Despite the advantages of the copper-cadmium photochromic glasses, commercial prospects are limited due to concerns over toxicity and disposal of cadmium.

U.S. Pat. No. 3,325,299 (Araujo) also discloses glasses with copper halides as the photochromic agent. The glasses are free of cadmium. The compositions, however, proved difficult to process and exhibited a hazy appearance that was unsuitable for most commercial applications. Haze-free photochromic glass compositions using copper halides as the photochromic agent were presented in U.S. Pat. No. 4,222,781 (Morse and Seward). The base glass composition was a $B_2O_3$—$Al_2O_3$—$SiO_2$ glass with alkali dopants in addition to copper and halides. Preferred compositions included low concentrations (~1 wt %) of $WO_3$ or $MoO_3$ to improve the photochromic response of the copper halide. Good photochromic response (darkening and fading) was observed for the glasses.

As the market for ophthalmic glasses has expanded, greater demands have been placed on the performance of photochromic glass. One concern is the recognition that overexposure of the eye to UV light is harmful. This concern has motivated interest in developing photochromic glasses that effectively filter UV light without compromising transmission in the visible. The silver halide, copper-cadmium halide, and copper halide photochromic glasses discussed above have absorption bands in the UV, but the absorption bands lack a sharp UV cutoff and the glasses transmit a significant amount of UV light. U.S. Pat. No. 5,281,562 (Araujo and Morgan) discloses copper halide glasses having sharp UV cutoff near 400 nm. The patent demonstrated that the shape and intensity of UV absorption bands depends on the concentration of copper in the glass. A series of compositions with sharp UV cutoffs were disclosed. The glasses described in U.S. Pat. No. 5,281,562 (Araujo), however, are not photochromic and lack the reversible photodarkening response desired for ophthalmic and other consumer applications.

There is a need for glasses having a sharp UV cutoff and a photochromic response.

SUMMARY

A photochromic material that includes a glass with a nanocrystalline phase is described. The glass is a modified boroaluminosilicate glass that includes a nanocrystalline cuprous halide phase. The photochromic material exhibits a sharp cutoff in the UV or short wavelength visible portion of the spectrum along with an absorption band at longer wavelengths in the visible. The nanocrystalline cuprous halide phase includes $Cu^{2+}$, which provides states within the bandgap of the cuprous halide that permit the material to absorb visible light. Absorption of visible light drives a photochromic transition without compromising the sharp cutoff. The nanocrystalline cuprous halide phase may optionally include Ag.

The present disclosure extends to:
A photochromic glass comprising:
 a base glass, said base glass including 19 wt %-39 wt % $B_2O_3$, 0.5 wt %-15 wt % $Al_2O_3$, 46 wt %-65 wt % $SiO_2$, 3.5 wt %-12.5 wt % alkali metal oxide, and 0.005 wt %-0.40 wt % $SnO_2$; and
  0.56 wt %-1.28 wt % copper; and
  0.1 wt %-0.7 wt %. halide; and
 a photochromic agent, said photochromic agent including a nanocrystalline cuprous halide phase within said base glass, said nanocrystalline cuprous halide phase including a copper component and a halide component, said copper component including at least a portion of said copper, said at least portion of said copper including $Cu^+$ and $Cu^{2+}$, said halide component including at least a portion of said halide;
 wherein said photochromic glass has a cutoff wavelength less than 410 nm.

The present disclosure extends to:
A method of making a photochromic glass comprising:
 melting a batch composition, said batch composition including 19 wt %-39 wt % $B_2O_3$, 0.5 wt %-15 wt % $Al_2O_3$, 46 wt %-65 wt % $SiO_2$, 3.5 wt %-12.5 wt % alkali metal oxide, 0.40 wt %-2.5 wt % CuO, and 0.01 wt %-1.3 wt % halide.

The present disclosure extends to:
A photochromic glass comprising:
 a base glass, said base glass including 19 wt %-39 wt % $B_2O_3$, 0.5 wt %-15 wt % $Al_2O_3$, 46 wt %-65 wt % $SiO_2$, 3.5 wt %-12.5 wt % alkali metal oxide, and 0.005 wt %-0.40 wt % $SnO_2$; and
  0.64 wt %-1.12 wt % copper; and
  0.1 wt %-0.7 wt %. halide; and
 a photochromic agent, said photochromic agent including a nanocrystalline cuprous halide phase within said base glass, said nanocrystalline cuprous halide phase including a copper component and a halide component, said copper component including at least a portion of said copper, said at least portion of said copper including $Cu^+$ and $Cu^{2+}$, said halide component including at least a portion of said halide; and
  0.005 wt %-0.05 wt % Ag; and
  0.05 wt %-0.50 wt % $WO_3$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
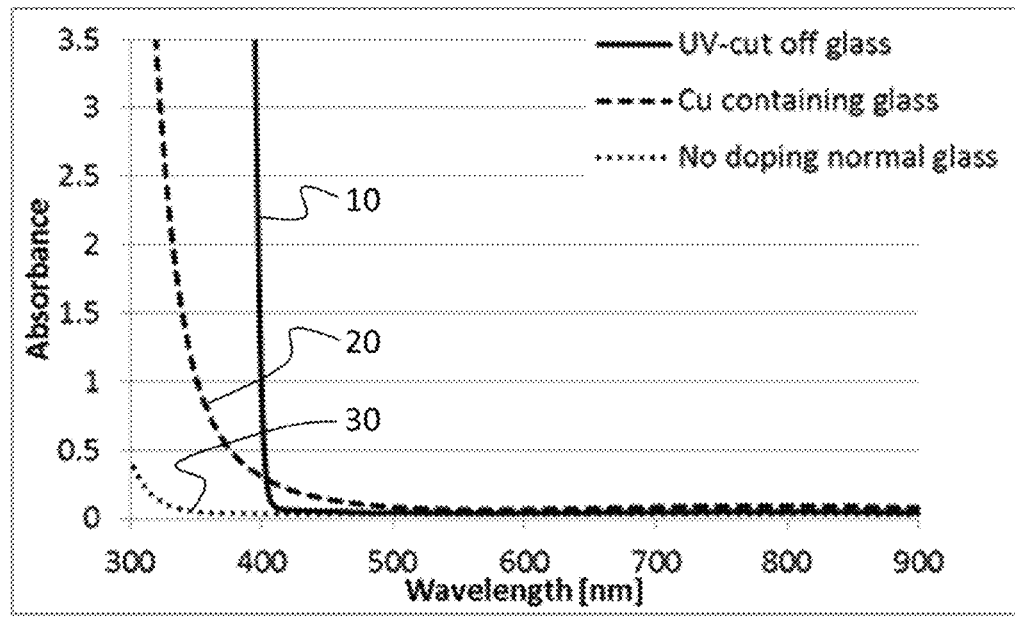
FIG. 1 depicts an absorption spectrum of a non-photochromic glass exhibiting excitonic absorption related to a cuprous halide nanocrystalline phase, an absorption spectrum of a non-photochromic copper-containing glass that lacks the excitonic absorption feature and an absorption spectrum of a non-photochromic glass without copper that lacks the excitonic absorption feature.

Reference will now be made in detail to illustrative embodiments of the present description.

The present specification describes photochromic glasses having various compositions. The glass compositions include various components present in various concentrations. The glasses are formed by melting and cooling a batch composition that includes the components of the glass. As used herein, concentration refers to the concentration of a component in the batch composition. Due to differences in volatility of different components, the concentration of a component in the glass formed following melting and cooling of the batch composition may differ slightly from the concentration of the component in the batch composition.

The present specification describes photochromic glasses that exhibit good photochromic response and a sharp cutoff at a UV wavelength or at a short wavelength visible wavelength. The photochromic response can be initiated by a wide range of wavelengths and exhibits favorable darkening and fading characteristics. When the photochromic response has been initiated and is manifest, the glass may be referred to as being in its photochromic or darkened state. When the photochromic response has faded or is not manifest, the glass may be referred to as being in its non-photochromic or faded state. The photochromic response transforms the glass from its non-photochromic state to its photochromic state. The photochromic response may also be referred to herein as a photodarkening response or a darkening response.

The photochromic glasses include a base glass and a photochromic agent. The base glass is an alkali-modified boroaluminosilicate glass. The base glass optionally includes a redox agent. The photochromic agent includes copper and a halide. The photochromic agent optionally includes silver, tungsten, and/or molybdenum.

The base glass is a $B_2O_3$—$Al_2O_3$—$SiO_2$ glass with alkali metal oxide modifiers. The $B_2O_3$ concentration is in the range from 18 wt %-41 wt %, or in the range from 19 wt %-39 wt %, or in the range from 20 wt %-37 wt %, or in the range from 22 wt %-35 wt %, or in the range from 24 wt %-33 wt %, or in the range from 26 wt %-31 wt %. The $Al_2O_3$ concentration is in the range from 0.7 wt %-15 wt %, or in the range from 1.0 wt %-13 wt %, or in the range from 2.0 wt %-11 wt %, or in the range from 3.5 wt %-10 wt %, or in the range from 5.0 wt %-9.0 wt %, or in the range from 6.0 wt %-8.0 wt %. The $SiO_2$ concentration is in the range from 46 wt %-65 wt %, or in the range from 48 wt %-63 wt %, or in the range from 50 wt %-61 wt %, or in the range from 52 wt %-59 wt %. The alkali metal oxide content is in the range from 3.5 wt %-12.5 wt %, or in the range from 4.0 wt %-11.5 wt %, or in the range from 4.5 wt %-10.5 wt %, or in the range from 5.0 wt %-9.5 wt %, or in the range from 6.0 wt %-8.5 wt %. The alkali metal oxide content may include one or more of $Li_2O$, $Na_2O$, or $K_2O$. In one embodiment, $Na_2O$ is the sole alkali metal oxide in the glass.

The base glass may optionally include a redox agent to influence the oxidation state of elements in the glass. The redox agent is an oxide of an element capable of transforming between two or more oxidation states. Representative redox agents include $As_2O_3$, $As_2O_5$, $Sb_2O_3$, SnO, and $SnO_2$. In one embodiment, the redox agent is SnO, $SnO_2$, or a combination thereof and the glass composition is free of As and Sb. The concentration of redox agent may be in the range from 0 wt %-1 wt %, or in the range from 0 wt %-0.80 wt %, or in the range from 0 wt % to 0.60 wt %, or in the range from 0 wt % to 0.40 wt %, or in the range from 0.005 wt %-0.60 wt %, or in the range from 0.005 wt %-0.40 wt %, or in the range from 0.005 wt %-0.25 wt %, or in the range from 0.01 wt %-0.50 wt %, or in the range from 0.01 wt %-0.40 wt %, or in the range from 0.01 wt %-0.25 wt %, or in the range from 0.05 wt %-0.30 wt %.

The photochromic agent includes a nanocrystalline cuprous halide phase that includes a copper component and a halide component. The copper component includes a combination of $Cu^+$ and $Cu^{2+}$. The halide component includes one or more of the halides $F^-$, $Cl^-$, $Br^-$, and $I^-$. The nanocrystalline cuprous halide phase may include two or more halides. The two or more halides may include $Cl^-$ and $Br^-$. The copper component can be incorporated by including CuO in the glass and heat treating the glass to form a nanocrystalline cuprous halide phase. The concentration of CuO in the glass may be in the range from 0.40 wt %-2.5 wt %, or in the range from 0.50 wt %-2.0 wt %, or in the range from 0.60 wt %-1.8 wt %, or in the range from 0.70 wt %-1.6 wt %, or in the range from 0.80 wt %-1.4 wt %, or in the range from 0.90 wt %-1.2 wt %.

The concentration of copper (Cu (in all oxidation states)) in the glass may be computed from the concentration of CuO in the glass by multiplying by the ratio of the molecular weight of Cu (63.55 g/mol) to the molecular weight of CuO (79.55 g/mol). The concentration of copper may be in the range from 0.32 wt %-2.00 wt %, or in the range from 0.40 wt %-1.60 wt %, or in the range from 0.48 wt %-1.44 wt %, or in the range from 0.56 wt %-1.28 wt %, or in the range from 0.64 wt %-1.12 wt %, or in the range from 0.72 wt %-0.96 wt %. The relative proportions of $Cu^+$ and $Cu^{2+}$ in the glass depend on the melting conditions and ambient as well as the presence and concentration of redox agent.

At least a portion of the total copper (Cu) content of the photochromic material is present in the nanocrystalline cuprous halide phase. Some copper (Cu) is also present in the base glass portion of the photochromic material.

Halide can be introduced to the photochromic glass by including alkali halides in the batch composition used to form the glass. Representative alkali halides include NaCl and NaBr. The total halide concentration in the glass may be in the range from 0.01 wt %-1.3 wt %, or in the range from 0.01 wt %-1.2 wt %, or in the range from 0.02 wt %-1.0 wt %, or in the range from 0.05 wt %-0.80 wt %, or in the range from 0.10 wt %-0.70 wt %, or in the range from 0.15 wt %-0.60 wt %, or in the range from 0.20 wt %-0.50 wt %.

In one embodiment, $Cl^-$ is the only halide present in the glass. The concentration of $Cl^-$ as the sole halide present in the glass may be in the range from 0.01 wt %-0.80 wt %, or in the range from 0.01 wt %-0.60 wt %, or in the range from 0.01 wt %-0.50 wt %, or in the range from 0.05 wt %-0.50 wt %.

In another embodiment, $Cl^-$ and $Br^-$ are the only halides present in the glass. The concentration of $Cl^-$ in the glass may be in the range from 0.01 wt %-0.60 wt % and the concentration of $Br^-$ may be in the range from 0.01 wt %-0.70 wt %, or the concentration of $Cl^-$ in the glass may be in the range from 0.01 wt %-0.50 wt % and the concentration of $Br^-$ may be in the range from 0.01 wt %-0.60 wt %, or the concentration of $Cl^-$ in the glass may be in the range from 0.01 wt %-0.40 wt % and the concentration of $Br^-$ may be in the range from 0.01 wt %-0.50 wt %.

The nanocrystalline cuprous halide phase may optionally include silver (Ag). The concentration of Ag in the glass may be in the range from 0.01 wt %-0.20 wt %, or in the range from 0.01 wt %-0.15 wt %, or in the range from 0.01 wt %-0.10 wt %, or in the range from 0.005 wt %-0.05 wt %, or in the range from 0.005 wt %-0.025 wt %, or in the range from 0.005 wt %-0.015 wt %. At least a portion of the total silver content of the photochromic material is present in the nanocrystalline cuprous halide phase. Some silver may be present in the base glass portion of the photochromic material. In one embodiment, essentially all of the silver is present in the nanocrystalline cuprous halide phase. Silver may be incorporated in the photochromic material by including silver oxide (AgO or $Ag_2O$) or silver nitrate ($AgNO_3$) in the batch composition and is predominantly present as $Ag^+$ in the glass.

The photochromic agent optionally includes tungsten and/or molybdenum. Tungsten may be incorporated by including a tungsten oxide (e.g. $WO_3$) in the batch composition. Molybdenum may be incorporated by including a molybdenum oxide (e.g. $MoO_3$) in the batch composition. The concentration of $WO_3$ in the photochromic glass may be in the range from 0 wt %-1.0 wt %, or in the range from 0.01 wt %-0.5 wt %, or in the range from 0.01 wt %-0.3 wt %, or in the range from 0.05 wt %-0.5 wt %, or in the range from 0.10 wt %-0.25 wt %. The concentration of $MoO_3$ in the photochromic glass may be in the range from 0 wt %-1.0 wt %, or in the range from 0.01 wt %-0.5 wt %, or in the range from 0.01 wt %-0.3 wt %, or in the range from 0.05 wt %-0.5 wt %, or in the range from 0.10 wt %-0.25 wt %. The combined concentration of $WO_3$ and $MoO_3$ in the photochromic glass may be in the range from 0 wt %-1.0 wt %, or in the range from 0.05 wt %-0.5 wt %, or in the range from 0.10 wt %-0.25 wt %.

The photochromic agent provides a sharp cutoff. The sharp cutoff may occur at a UV wavelength or at a wavelength in the short wavelength portion of the visible portion of the spectrum. Under processing conditions described hereinbelow, at least a portion of the copper and halide components precipitate in the form of nanocrystals in the glass. The nanocrystals include copper in the form of cuprous ion ($Cu^+$) and halide ion(s). The sharp cutoff is due to an excitonic absorption band associated with crystalline cuprous halides. The excitonic absorption band is at or near the bandedge of the cuprous halide nanocrystals and features a sharp absorption edge near 400 nm. Wavelengths shorter than the wavelength of the absorption edge are strongly absorbed, while wavelengths longer than the wavelength of the absorption edge are transmitted with high efficiency.

The sharp cutoff is characterized as a steep rise in absorption in the direction of decreasing wavelength from the visible to the UV. The steep rise may be quantified as the slope of the absorption edge, which corresponds to the rate of change of the absorption coefficient (expressed in units of $cm^{-1}$) with respect to wavelength (expressed in units of nm). The slope of the absorption edge of the present glasses may be at least 0.10 $cm^{-1}$/nm, or at least 0.20 $cm^{-1}$/nm, at least 0.30 $cm^{-1}$/nm, at least 0.40 $cm^{-1}$/nm, or in the range from 0.10 $cm^{-1}$/nm-1.0 $cm^{-1}$/nm, or in the range from 0.15 $cm^{-1}$/nm-0.80 $cm^{-1}$/nm, or in the range from 0.20 $cm^{-1}$/nm-0.70 $cm^{-1}$/nm, or in the range from 0.30 $cm^{-1}$/nm-0.60 $cm^{-1}$/nm. The slope of the absorption edge may be expressed herein as the slope of the absorption edge at a selected wavelength. The selected wavelength may be a wavelength less than 420 nm, or less than 410 nm, or less than 400 nm, or less than 390 nm, or in the range from 370 nm-420 nm, or in the range from 380 nm-410 nm, or in the range from 390 nm-405 nm.

The cutoff wavelength is defined herein as the wavelength at which transmission through a 2 mm thick sample of the glass is 1%. The cutoff wavelength is a wavelength in the UV or the short wavelength portion of the visible. The cutoff wavelength may be a wavelength less than or equal to 420 nm, or less than or equal to 415 nm, or less than or equal to 410 nm, or less than or equal to 405 nm, or less than or equal to 400 nm, or less than or equal to 395 nm, or less than or equal to 390 nm, or in the range from 370 nm-420 nm, or in the range from 380 nm-410 nm, or in the range from 390 nm-405 nm.

Wavelengths longer than the cutoff wavelength are transmitted with high efficiency through the glass and wavelengths shorter than the cutoff wavelength are transmitted with low efficiency through the glass. Wavelengths longer than the cutoff wavelength may be referred to herein as wavelengths above the cutoff wavelength. Wavelengths shorter than the cutoff wavelength may be referred to herein as wavelengths below the cutoff wavelength.

Transmission through a 2 mm thick sample of the glass may be 99% or greater for a wavelength range extending from the cutoff wavelength to 25 nm above the cutoff wavelength. Transmission through a 2 mm thick sample of the glass may be 99% or greater for a wavelength range extending from the cutoff wavelength to 50 nm above the cutoff wavelength. Transmission through a 2 mm thick sample of the glass may be 99% or greater for a wavelength range extending from the cutoff wavelength to 100 nm above the cutoff wavelength. Transmission through a 2 mm thick sample of the glass may be 99% or greater for a wavelength range extending from the cutoff wavelength to 200 nm above the cutoff wavelength.

Transmission through a 2 mm thick sample of the glass may be 1% or less for a wavelength range extending from the cutoff wavelength to 25 nm below the cutoff wavelength. Transmission through a 2 mm thick sample of the glass may be 1% or less for a wavelength range extending from the cutoff wavelength to 50 nm below the cutoff wavelength. Transmission through a 2 mm thick sample of the glass may be 1% or less for a wavelength range extending from the cutoff wavelength to 75 nm below the cutoff wavelength. Transmission through a 2 mm thick sample of the glass may be 1% or less for a wavelength range extending from the cutoff wavelength to 100 nm below the cutoff wavelength.

In one embodiment, the photochromic glass is uncolored in the absence of a photochromic response. As used herein, uncolored means that a viewer with average vision perceives no color when looking through a sample of the glass (in its non-photochromic state) having a thickness of 2 mm. In this embodiment, the cutoff wavelength is positioned so that visible wavelengths transmit with high efficiency (≥99% transmittance) through the glass (in its non-photochromic state), while UV wavelengths transmit with low efficiency (≤1% transmittance) through the glass (in its non-photochromic state).

As described more fully hereinbelow, the spectral position of the absorption edge may be varied by controlling the composition of the cuprous halide nanocrystals. Selection of the halide component, for example, influences the spectral position of the absorption edge. The absorption edge of cuprous chloride nanocrystals occurs at shorter wavelength than the absorption edge of cuprous bromide nanocrystals. Intermediate positions of the absorption edge can be obtained by including a combination of chloride and bromide in the cuprous halide nanocrystals, where the absorption edge shifts to longer wavelengths as the bromide content of the nanocrystals increases relative to the chloride content of the nanocrystals.

While not wishing to be bound by theory, it is believed that the cuprous halide nanocrystals of the present glasses include $Cu^{2+}$. It is further believed that the presence of $Cu^{2+}$ in the cuprous halide nanocrystals provides an absorption feature that enables initiation of a photochromic response from the cuprous halide nanocrystals upon exposure to visible light. The absorption feature occurs in the visible portion of the spectrum at an energy less than the energy of the absorption edge associated with the excitonic absorption. The absorption feature is absent in the non-photochromic cuprous halide glasses described in U.S. Pat. No. 5,281,562. The present glasses demonstrate that proper control of the oxidation state of copper in the glass and the overall oxidation state of the glass enables incorporation of $Cu^{2+}$ in the cuprous halide nanocrystals and that the presence of $Cu^{2+}$ in the cuprous halide nanocrystals enables the cuprous halide nanocrystals to exhibit a photochromic response while preserving the sharp cutoff in the UV or short wavelength visible portions of the spectrum associated with cuprous halide nanocrystals that lack $Cu^{2+}$.

FIG. 1 shows absorption spectra for a glass having cuprous halide nanocrystals and a glass of similar composition lacking cuprous halide nanocrystals. Spectrum 10 shows the spectrum of a 2 mm thick sample of glass having the composition 77.05 wt % $SiO_2$, 2.16 wt % $Al_2O_3$, 14.6 wt % $B_2O_3$, 4.5 wt % $Na_2O$, 0.44 wt % $SnO_2$, 0.28 wt % CuO, 0.14 wt % $Cl^-$, and 0.057 wt % $Br^-$. Spectrum 10 indicates high transmission in the visible and the presence of a steep absorption edge near 400 nm. The steep absorption edge indicates the presence of cuprous halide nanocrystals in the glass and corresponds to an excitonic absorption process in the cuprous halide nanocrystals. Spectrum 20 shows the spectrum of a 2 mm thick glass sample lacking cuprous halide nanocrystals. The glass had the composition 54.35 wt % $SiO_2$, 6.87 wt % $Al_2O_3$, 28.6 wt % $B_2O_3$, 7.77 wt % $Na_2O$, 0.10 wt % $SnO_2$, 1.20 wt % CuO, 0.18 wt % $WO_3$, and 0.023 wt % Ag. The composition included Cu, but lacked halides. Spectrum 20 indicates high transmission in the visible and gradually increasing absorption in the UV. The broad UV absorption band observed in spectrum 20 corresponds to bandgap absorption of the glass. The absence of cuprous halide nanocrystals in the glass precludes observation of the sharp excitonic absorption feature observed in spectrum 10. The glass exhibiting spectrum 10 provides superior cutoff performance relative to the glass exhibiting spectrum 20. Although the glass exhibiting spectrum 20 absorbs UV radiation, it does so incompletely and appreciable amounts of UV intensity pass through the glass.

Spectrum 30 shows the spectrum of a 2 mm thick glass sample of a representative base glass. The glass had the composition 56.14 wt % $SiO_2$, 6.01 wt % $Al_2O_3$, 29.9 wt % $B_2O_3$, 8.38 wt % $Na_2O$, and 0.12 wt % $SnO_2$. The glass lacks Cu and lacks halides. Spectrum 30 indicates that the glass does not exhibit a sharp UV cutoff and transmits a significant portion of the UV spectrum. The bandedge absorption is shifted to significantly shorter wavelengths relative to the glasses described by spectrum 10 and spectrum 20. The results indicate that inclusion of Cu shifts the absorption edge to longer wavelength and that further inclusion of halide, within certain compositional and preparation conditions, provides a sharp cutoff wavelength.

Figure 2:
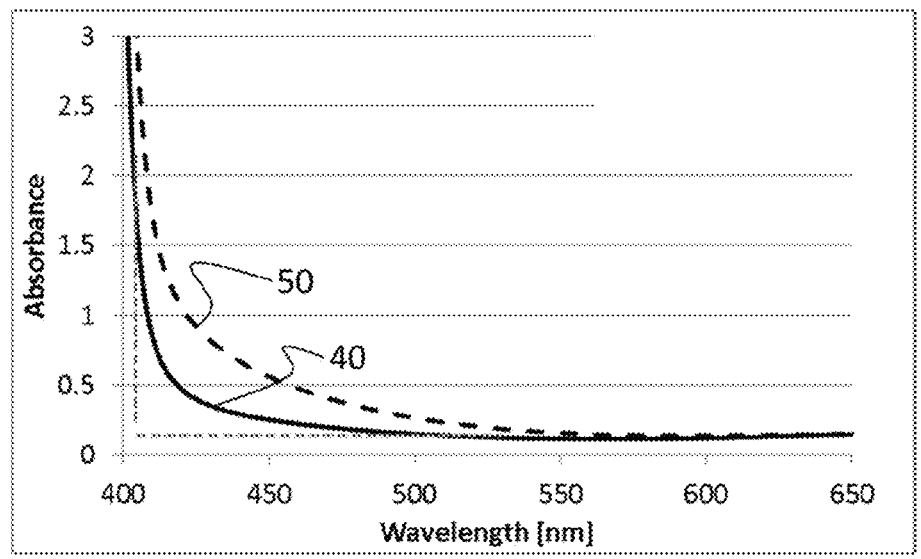
FIG. 2 depicts an absorbance spectrum of two glasses that exhibit excitonic absorption and absorption due to the presence of $Cu^{2+}$ in the cuprous halide nanocrystalline phase, where one of the glasses (dashed line) includes $WO_3$ in the composition and the other glass (solid line) does not.

Although the glass exhibiting spectrum 10 exhibits a sharp cutoff, it is not photochromic. The glasses herein feature both a sharp cutoff and a photochromic response. FIG. 2 shows the spectrum of representative glasses in accordance with the present disclosure. Spectrum 40 shows the spectrum of a 2 mm thick sample of a glass having the composition 54.58 wt % $SiO_2$, 6.91 wt % $Al_2O_3$, 27.70 wt % $B_2O_3$, 7.8 wt % $Na_2O$, 0.11 wt % $SnO_2$, 1.12 wt % CuO, 0.02 wt % Ag, 0.132 wt % $Cl^-$, and 0.321 wt % $Br^-$. The glass includes cuprous halide nanocrystals and its spectrum exhibits a sharp excitonic absorption edge near 400 nm. The glass associated with spectrum 40 also exhibits an additional absorption feature at wavelengths extending beyond the excitonic absorption band into the visible (up to ~500 nm). The additional absorption feature is believed to be attributable to the presence of $Cu^{2+}$ in the cuprous halide nanocrystalline phase of the glass. The presence of $Cu^{2+}$ is evidenced by a slight green tint of the glass and the presence of an absorption band near 800 nm (not shown) that is consistent with known crystal field transitions of $Cu^{2+}$.

Spectrum 50 shows the spectrum of a 2 mm thick sample of a glass having the composition 54.43 wt % $SiO_2$, 6.90 wt % $Al_2O_3$, 28.0 wt % $B_2O_3$, 7.74 wt % $Na_2O$, 0.10 wt % $SnO_2$, 1.12 wt % CuO, 0.17 wt % $WO_3$, 0.019 wt % Ag, 0.132 wt % $Cl^-$, and 0.325 wt % $Br^-$. Except for inclusion of $WO_3$, the glass exhibiting spectrum 50 is compositionally similar to the glass exhibiting spectrum 40. Inclusion of $WO_3$ in the glass leads to an enhancement of absorption in the visible portion of the spectrum in addition to the absorption due to the presence $Cu^{2+}$ in the cuprous halide nanocrystals. The sharp UV cutoff near 400 nm is retained.

Without wishing to be bound by theory, the presence of $Cu^{2+}$ in the cuprous halide nanocrystalline phase is believed to introduce defect states into the bandgap of the cuprous halide nanocrystals. The presence of defect states in the bandgap provides additional states between which absorption transitions can occur. Such absorption transitions would occur at energies below the bandgap energy and hence at wavelengths longer than the absorption transitions associated with bandedge absorption or excitonic absorption. It is believed that the $Cu^{2+}$-related defect absorption band observed in FIG. 2 originates from defect states present in the bandgap of the cuprous halide nanocrystals. When $Cu^{2+}$ is incorporated into cuprous halide nanocrystals, it occupies a $Cu^+$ site. In order to preserve charge neutrality, one $Cu^{2+}$ ion enters the structure and two $Cu^+$ ions are removed. The $Cu^{2+}$ ion occupies one of the $Cu^+$ sites and the other $Cu^+$ site is vacant. The vacancy and $Cu^{2+}$ ion represent perturbations in the structure of the cuprous halide nanocrystal. The perturbations interrupt periodicity and produce states in the bandgap. The vacancy associated with the missing $Cu^+$ ion is a cation vacancy. Absence of the $Cu^+$ ion is believed to lower the binding energy of electrons on $Cl^-$ ions neighboring the vacancy to produce defect-related energy states positioned at energies slightly above the valence band edge of the cuprous halide nanocrystals. Similarly, $Cu^{2+}$ is electron deficient relative to the $Cu^+$ ion that it replaces and exerts a stronger attractive force on neighboring $Cl^-$ ions to produce defect-related energy states positioned at energies slightly below the conduction band edge of the cuprous halide nanocrystals.

The net effect of incorporation of $Cu^{2+}$ in the cuprous halide nanocrystals is the introduction of one or more defect-related energy states in the bandgap of cuprous halide. The defect-related energy states may be positioned in the band gap near the conduction bandedge and/or the valence bandedge. Optical transitions between defect states, between states in the valence band and a defect state, or between a defect state and the conduction band occur at energies below the energy of the band gap and at energies below the energy of the excitonic absorption. One or more transitions of these types contribute to the $Cu^{2+}$-related defect absorption observed in the visible in the present photochromic glasses.

The cuprous halide nanocrystalline phase may absorb in the visible at wavelengths less than 550 nm, or less than 525 nm, or less than 500 nm, or less than 475 nm, or less than 450 nm, or in the range from 400 nm-575 nm, or in the range from 400 nm-550 nm, or in the range from 400 nm-525 nm.

The presence of the $Cu^{2+}$-related defect absorption feature in the visible is believed to enable a photochromic response in the present glasses. The mechanism of the photochromic response includes a reduction of $Cu^+$ to $Cu^0$ and aggregation of $Cu^0$ ions within or on the surface of the cuprous halide nanocrystals to form a $Cu^0$ nanophase. The $Cu^0$ nanophase has a surface plasmon that broadly absorbs in the visible to provide a photodarkening effect. The $Cu^{2+}$-related defect absorption in the visible provides a mechanism for introducing the energy needed to induce a photochromic response in the cuprous halide nanocrystals by providing the energy needed to effect photoreduction of $Cu^+$ to $Cu^0$. In glasses having cuprous halide nanocrystals that lack a photochromic response, the $Cu^{2+}$-related defect feature is not observed and there is no mechanism through which visible light can introduce the energy necessary to drive photoreduction of $Cu^+$ to $Cu^0$. The non-photochromic cuprous halide glasses may or may not include $Cu^{2+}$. If present, however, any $Cu^{2+}$ in the non-photochromic cuprous halide glasses exists in the glass phase and not the nanocrystalline cuprous halide phase.

The present glasses can be prepared by batch melting the constituent oxide and halide compounds in proportions consistent with the compositions described herein. The constituent components are combined to form a batch composition and melted. Melting may be conducted in crucibles or other suitable vessels and the molten glass may be formed into glass by conventional forming methods such as drawing, spinning, pressing, molding, cooling etc. The glass may optionally be annealed.

To impart a sharp cutoff in the UV or short wavelength visible portion of the spectrum to the glass, it is necessary to establish a cuprous halide nanocrystalline phase in the glass. To further insure photochromic response upon visible excitation, it is necessary in one embodiment for the cuprous halide nanocrystalline phase to include an effective amount of $Cu^{2+}$. The present glass compositions and heat treatment conditions establish an oxidation state for the glass that enables formation of a cuprous halide nanocrystalline phase with a suitable concentration of $Cu^{2+}$.

Heat treatment conditions favorable to the formation of cuprous halide nanocrystals include heating to 480° C. to 550° C. in an ambient of air and holding for at least 1 min, or at least 10 min, or at least 20 min, or at least 30 min, or at least 1 hr, or at least 2 hr, or at least 4 hr, or at least 8 hr, or at least 12 hr, or at least 16 hr, or for a time in the range from 1 min-24 hr, or for a time in the range from 1 min-12 hr, or for a time in the range from 5 min-24 hr, or for a time in the range from 30 min-20 hr, or for a time in the range from 1 hr-16 hr, or for a time in the range from 1 hr-10 hr.

The heat treatment occurs after melting the batch composition. The batch composition may be cooled and solidified. Heat treatment as disclosed herein may occur during cooling of the batch composition as the batch composition cools from the melting conditions to room temperature before room temperature is reached. Alternatively, heat treatment may occur after the batch composition has been solidified or cooled to room temperature by subsequently reheating the solidified batch composition to the heat treatment conditions disclosed herein.

Figure 3A:
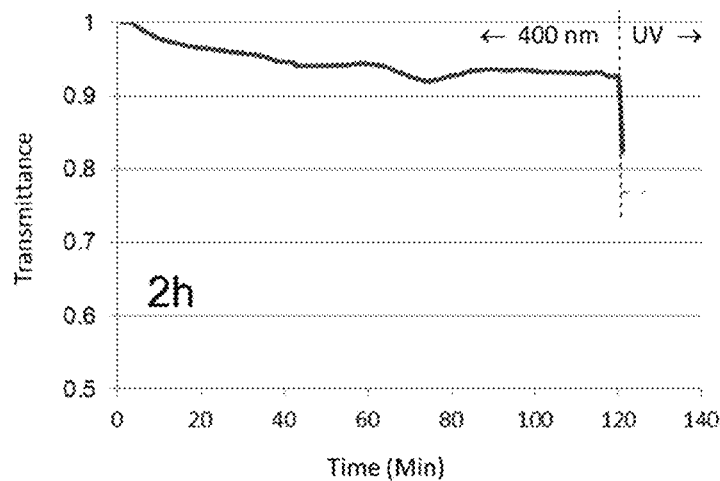
FIGS. 3A, 3B, and 3C, respectively, show the transmittance of light from a broadband source, with and without a 400 nm longpass filter, through a photochromic glass containing copper halide nanocrystals that has been subjected to heat treatment at 500° C. for 2 hr, 12 hr, and 24 hr.
Figure 3B:
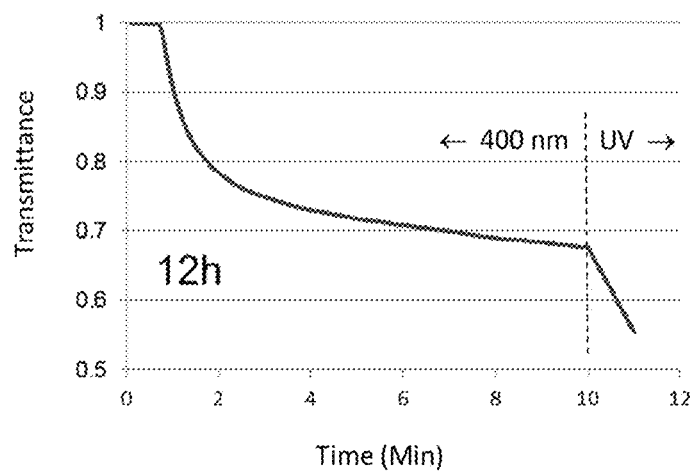
Figure 3C:
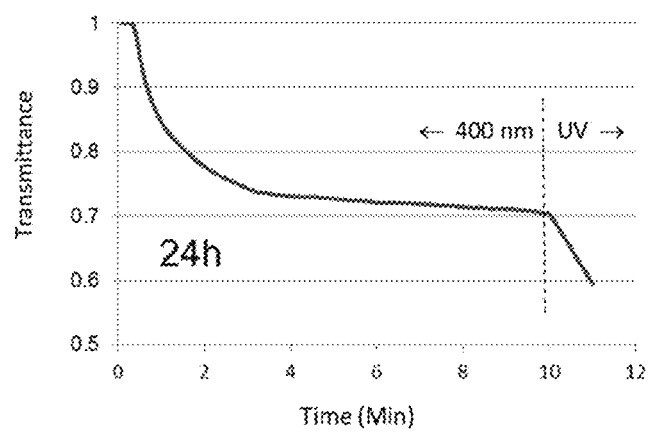

FIGS. 3A-3C illustrate the photodarkening response of a representative glass at different heat treatment conditions. The glass composition was: 54.44 wt % $SiO_2$, 6.98 wt % $Al_2O_3$, 28.68 wt % $B_2O_3$, 7.70 wt % $Na_2O$, 0.93 wt % CuO, 0.83 wt % $As_2O_3$, 0.168 wt % $Cl^-$, and 0.19 wt % $Br^-$. The thickness of the glass was 2 mm. The glass was heat treated at 500° C. in air for 2 hr (FIG. 3A), 12 hr (FIG. 3B), and 24 hr (FIG. 3C). The graphs show transmission as a function of time of exposure to a broad band light source (1 kW HgXe lamp). For exposure times up to the time demarcated by the dashed line in FIGS. 3A-3C, the light source was filtered with a 400 nm longpass filter and the glass was exposed only to light having a wavelength longer than 400 nm. For exposure times longer than the time demarcated by the dashed line in FIGS. 3A-3C, the longpass filter was removed and the sample was exposed to the full spectrum of the light source.

The photodarkening response was characterized by measuring the transmittance of a green laser beam through the sample. The intensity of the green laser beam was kept low to prevent the green laser from altering the photodarkening effect produced by the broadband light source. Before heat treatment, the glass exhibited high transmission at 400 nm. Upon heat treatment a strong absorption edge is formed due to the formation of cuprous halide nanocrystals. The absorption edge is evident upon heating for short times (e.g. FIG. 3A). The wavelength of the absorption edge is controlled by the $Cl^-$ to $Br^-$ ratio in the cuprous halide nanocrystals. Upon further heat treatment (e.g. FIGS. 3B and 3C), the presence of the cuprous halide phase induces photochromism, as evidenced by the decrease in transmittance observed when the glass was illuminated with wavelengths of light greater than 400 nm.

Figure 4:
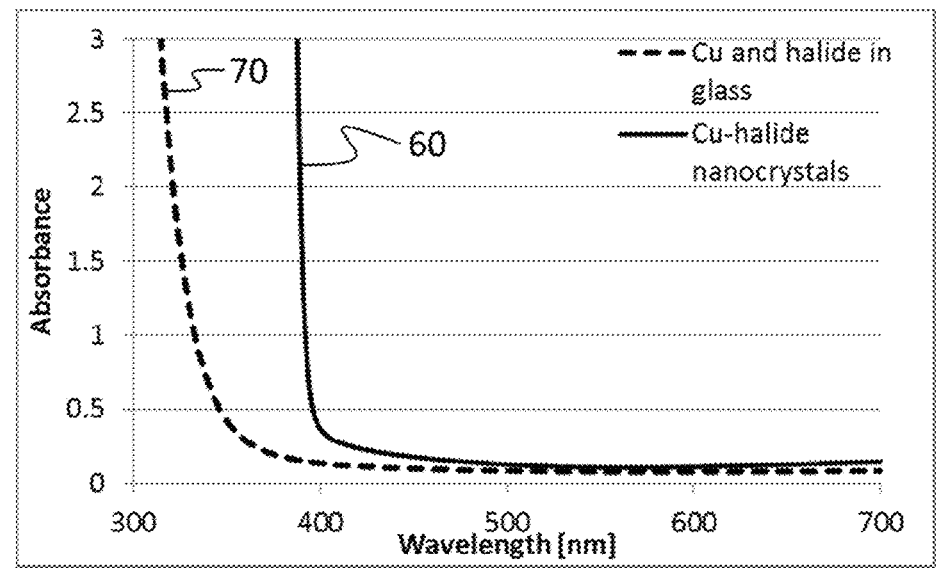
FIG. 4 depicts the absorption spectra of two glasses containing copper and halides, only one of which has a base glass composition suitable for stabilizing a copper halide nanocrystalline phase.

FIG. 4 shows the absorption spectrum of two glasses that include copper and halide. Spectrum 60 was measured for a 2 mm thick glass having the composition 53.89 wt % $SiO_2$, 8.65 wt % $Al_2O_3$, 26.60 wt % $B_2O_3$, 8.64 wt % $Na_2O$, 0.96 wt % CuO, 0.71 wt % $As_2O_3$, 0.218 wt % $Cl^-$, and 0.121 wt % $Br^-$. Spectrum 70 was measured for a 2 m thick glass having the composition 51.22 wt % $SiO_2$, 21.02 wt % $Al_2O_3$, 10.40 wt % $B_2O_3$, 14.02 wt % $Na_2O$, 0.85 wt % CuO, 0.66 wt % $As_2O_3$, 0.286 wt % $Cl^-$, and 0.121 wt % $Br^-$. The spectra of FIG. 4 show that while both glasses contain copper and halides, only the glass having spectrum 60 exhibited an exciton absorption feature that provides a sharp cutoff near 400 nm. The base glass for the glass exhibiting spectrum 70 is outside the range that permits formation of copper halide nanocrystals upon heat treatment. The lack of an excitonic absorption feature in spectrum 70 is due to the absence of copper halide nanocrystals in the glass. The results of FIG. 4 indicate that stabilization of copper halide nanocrystals from glasses containing copper and halide components requires a base glass having a suitable composition. The mere presence of copper and halide(s) in a glass is insufficient to enable stabilization of a copper halide nanocrystalline phase.

Figure 5:
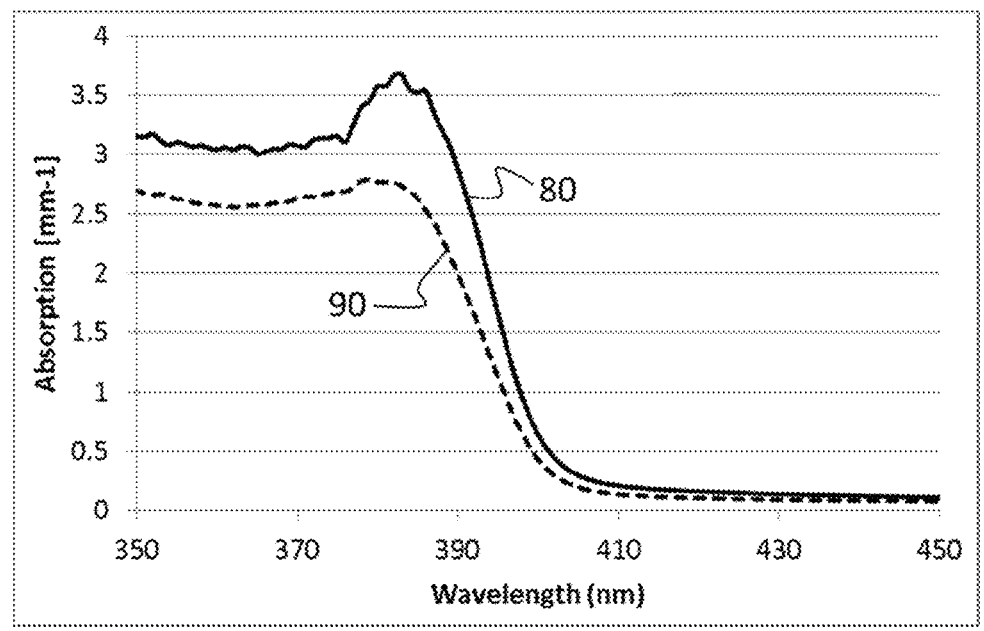
FIG. 5 shows absorption spectra of Cu-halide photochromic glasses having a thickness of ~200 µm in the vicinity of the excitonic absorption feature.

FIG. 5 shows the absorption spectra of two glasses exhibiting excitonic absorption. Spectrum 80 was measured for a 248 μm thick glass having the composition 54.21 wt % $SiO_2$, 6.89 wt % $Al_2O_3$, 28.73 wt % $B_2O_3$, 7.76 wt % $Na_2O$, 1.04 wt % CuO, 0.10 wt % $SnO_2$, 0.17 $WO_3$ wt %, 0.021 wt % Ag, 0.132 wt % $Cl^-$, and 0.316 wt % $Br^-$. Spectrum 90 was measured for a 268 μm thick glass having the composition 54.26 wt % $SiO_2$, 6.90 wt % $Al_2O_3$, 28.73 wt % $B_2O_3$, 7.86 wt % $Na_2O$, 0.94 wt % CuO, 0.10 wt % $SnO_2$, 0.17 $WO_3$ wt %, 0.019 wt % Ag, 0.077 wt % $Co_2O_3$, 0.134 wt % $Cl^-$, and 0.321 wt % $Br^-$. Both glasses include copper, halides, Ag, and $WO_3$. The glass having spectrum 90 also includes a low concentration of $Co_2O_3$. The results indicate that for glasses having a suitable base glass composition, the introduction of Ag, $WO_3$ and colorants does not preclude formation of copper halide nanocrystals. The excitonic absorption feature is observed in both glasses.

Figure 6A:
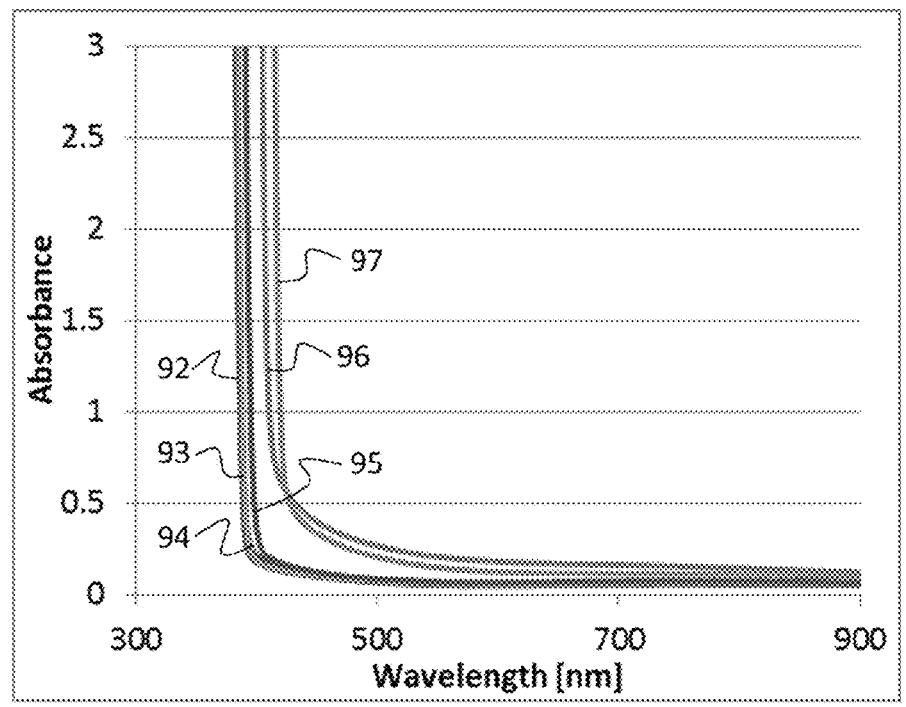
FIG. 6A shows absorption spectra of a series of photochromic glasses having cuprous halide nanocrystalline phases with various relative proportions of $Cl^-$ and $Br^-$.
Figure 6B:
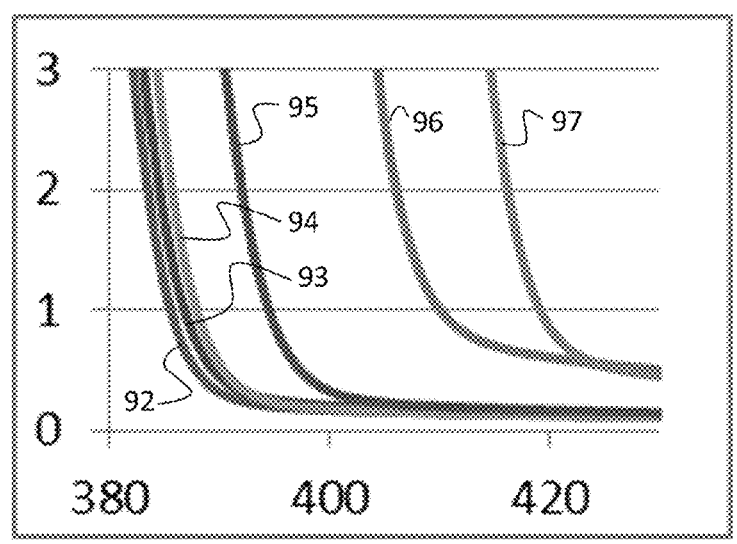
FIG. 6B shows an enlargement of the spectra shown in FIG. 6A in the vicinity of the cutoff wavelength.

FIGS. 6A and 6B show absorption spectra for a series of samples that differ in halide composition of the cuprous halide nanocrystalline phase. The glasses have the compositions 92-97 listed in Table 1 below and have spectra depicted respectively as traces 92-97 in FIGS. 6A and 6B.

Spectra for compositions 92, 93, and 94 are similar on the scale depicted in FIG. 6A and are more easily distinguished in the enlargement shown in FIG. 6B.

TABLE 1

Composition (in wt %) of Glasses with Spectra depicted in FIGS. 6A and 6B

|  | 92 | 93 | 94 | 95 | 96 | 97 |
|---|---|---|---|---|---|---|
| $SiO_2$ | 54.79 | 54.77 | 54.79 | 54.82 | 54.77 | 54.88 |
| $Al_2O_3$ | 7.06 | 7.06 | 7.06 | 7.07 | 7.08 | 7.11 |
| $B_2O_3$ | 28.70 | 28.68 | 28.67 | 28.65 | 28.59 | 28.52 |
| $Na_2O$ | 8.07 | 8.05 | 8.08 | 8.04 | 8.01 | 8.03 |
| CuO | 0.88 | 0.89 | 0.86 | 0.86 | 0.83 | 0.76 |
| $As_2O_3$ | 0.65 | 0.64 | 0.64 | 0.64 | 0.63 | 0.64 |
| $Cl^-$ | 0.337 | 0.301 | 0.271 | 0.201 | 0.097 | 0.014 |
| $Br^-$ | 0 | 0.051 | 0.103 | 0.218 | 0.374 | 0.525 |

Figure 7:
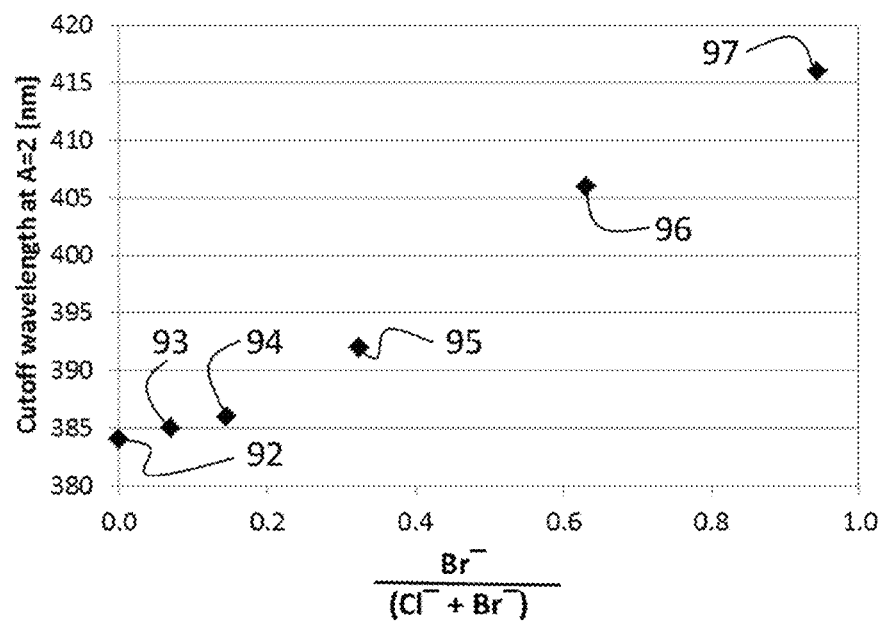
FIG. 7 shows the variation in UV cutoff wavelength as a function of the relative amounts of $Br^-$ and $Cl^-$ in the cuprous halide nanocrystalline phase of photochromic glasses.

The base glass composition is similar for compositions 92-97. The difference of interest is in the halide content. The $Cl^-$ concentration decreases across the series of compositions 92-97 and the $Br^-$ concentration increases across the series of compositions 92-97. Each of the spectra exhibit an excitonic absorption feature, consistent with the presence of a cuprous halide nanocrystalline phase. The results indicate that as the $Br^-$ concentration increases, the cutoff wavelength associated with the excitonic absorption feature shifts to longer wavelength. The shortest cutoff wavelength was observed for composition 92 and progressively longer cutoff wavelengths were observed as the $Br^-$ concentration increased. FIG. 6B shows an enlargement of the spectra in the vicinity of the cutoff wavelength. The trend is quantified in FIG. 7, which shows the UV cutoff wavelength as a function of the ratio of $Br^-$ content (wt % Br normalized to the molecular weight of Br (79.9 g/mol)) to total halide content ($Br^-+Cl^-$) (sum of wt % Br normalized to the molecular weight of Br (79.9 g/mol) and wt % Cl normalized to the molecular weight of Cl (35.5 g/mol)) in the glass. The data points in FIG. 7 are labeled according to the compositions presented in Table 1 and FIGS. 6A and 6B. The data demonstrate the ability to control the cutoff wavelength by varying the halide composition of the cuprous halide nanocrystalline phase.

In further embodiments, the present description extends to photochromic glasses having sharp UV cutoffs with a cuprous halide nanocrystalline phase that includes silver. The silver-containing cuprous halide nanocrystalline phase also includes $Cu^{2+}$. Silver can be incorporated in the glass composition by including a silver precursor, such as silver oxide (AgO or $Ag_2O$) or silver nitrate ($AgNO_3$), in the batch composition. Silver is primarily present as $Ag^+$ in the glass and is reduced to $Ag^0$ by photoreduction during the photochromic transition.

Figure 8A:
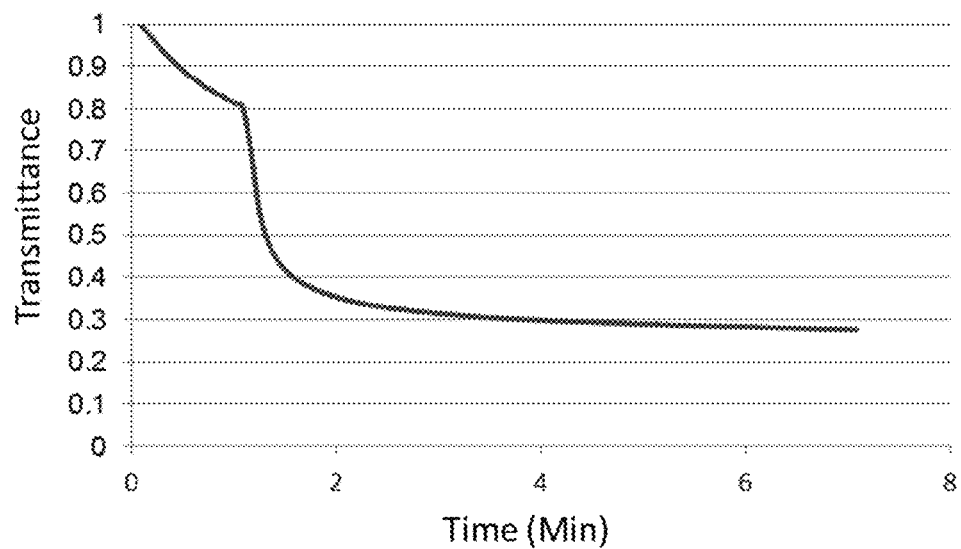
FIGS. 8A and 8B, respectively, compare the photodarkening response of photochromic glasses having a cuprous halide nanocrystalline phase with Ag and without Ag.
Figure 8B:
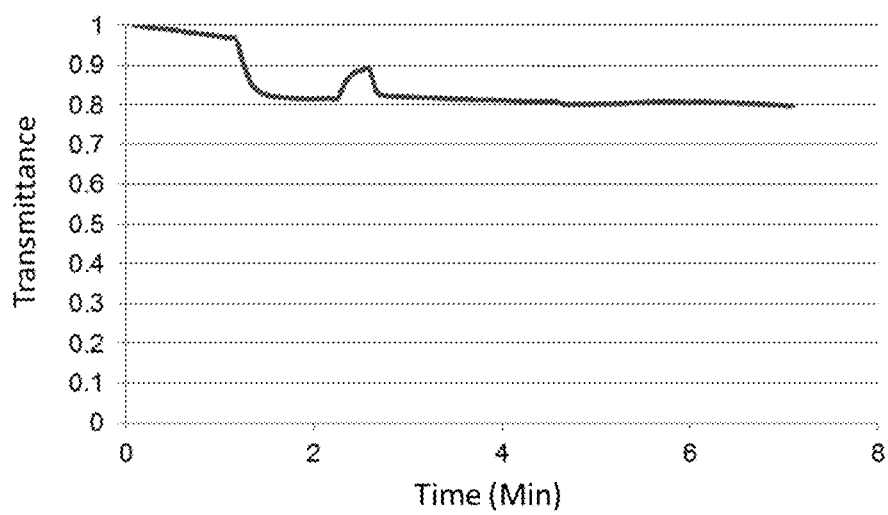

It has been observed that incorporation of Ag in the cuprous halide nanocrystals enhances photochromic performance. FIGS. 8A and 8B show the photodarkening response of two photochromic glasses. The photodarkening response was measured as described hereinabove in connection with FIGS. 3A-3C. The glass depicted in FIG. 8A had a thickness of 2 mm and the composition 54.21 wt % $SiO_2$, 6.89 wt % $Al_2O_3$, 28.73 wt % $B_2O_3$, 7.76 wt % $Na_2O$, 1.04 wt % CuO, 0.10 wt % $SnO_2$, 0.17 $WO_3$ wt %, 0.021 wt % Ag, 0.132 wt % $Cl^-$, and 0.316 wt % $Br^-$ and included Ag in the cuprous halide nanocrystalline phase. The glass depicted in FIG. 8B had a thickness of 2 mm and the composition 54.53 wt % $SiO_2$, 6.93 wt % $Al_2O_3$, 28.78 wt % $B_2O_3$, 7.91 wt % $Na_2O$, 1.07 wt % CuO, 0.11 wt % $SnO_2$, 0.149 wt % $Cl^-$, and 0.33 wt % $Br^-$ and lacked Ag in the cuprous halide nanocrystalline phase. The results show a significant enhancement in the rate of photodarkening for the glass when Ag was included in the composition. The presence of $WO_3$ in the composition also facilitated the photodarkening process. The peak near 2.5 min in FIG. 8B shows fading as the illuminating lamp was covered for 30 s.

Figure 9A:
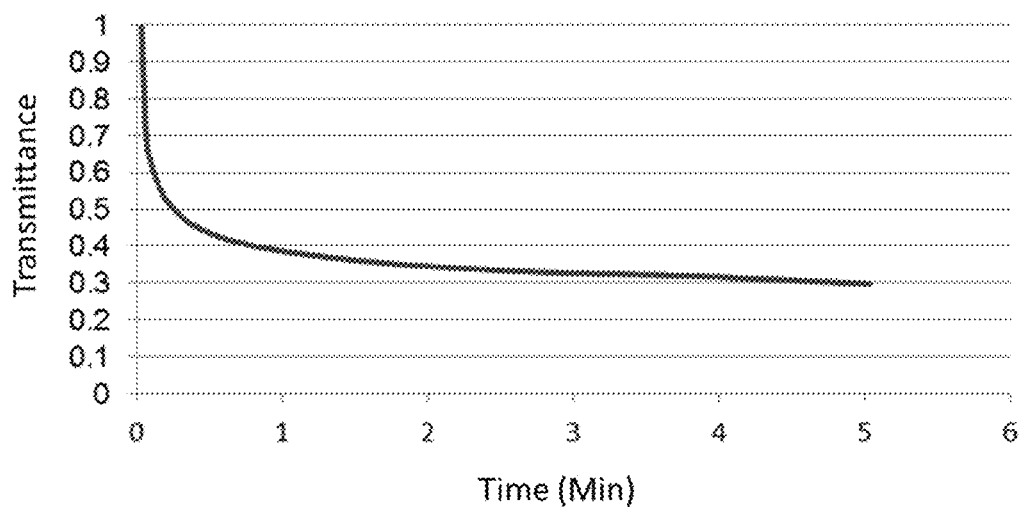
FIGS. 9A-9C, respectively, illustrate the photodarkening response of a photochromic glass having a cuprous halide nanocrystalline phase at 72° F., 122° F., and 160° F.
Figure 9B:
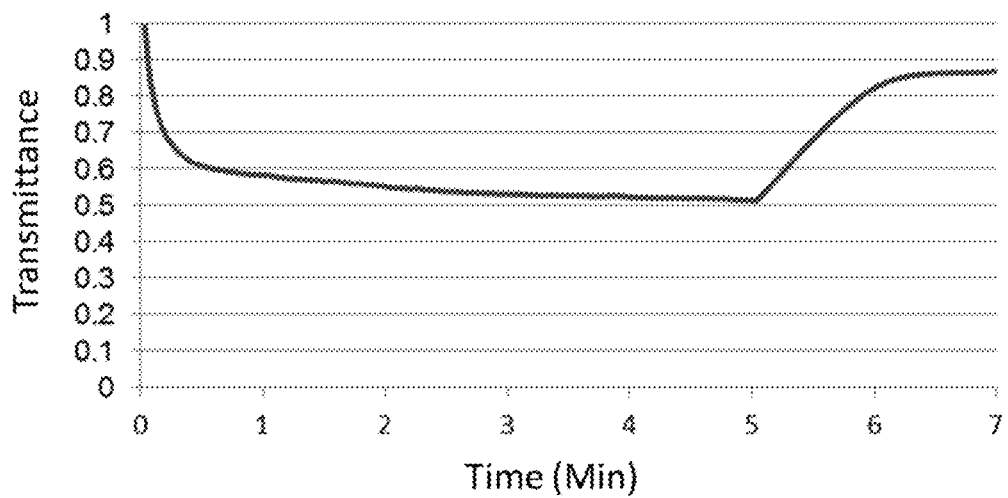
Figure 9C:
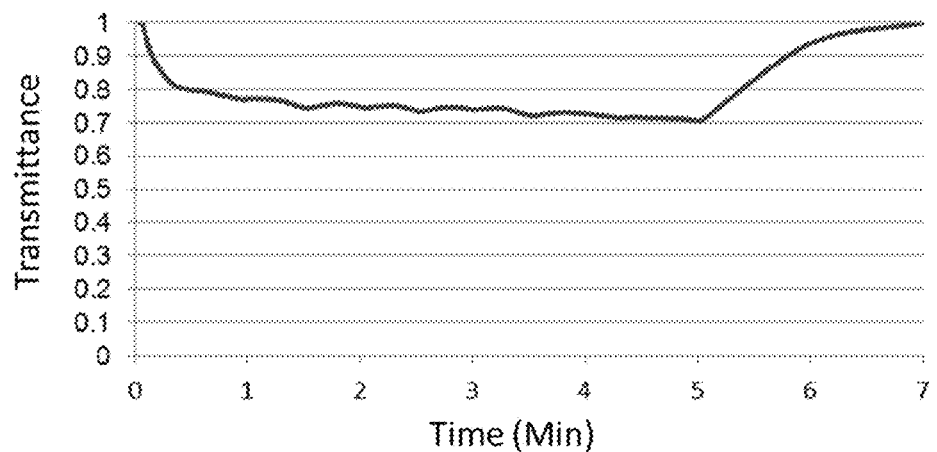
Figure 9D:
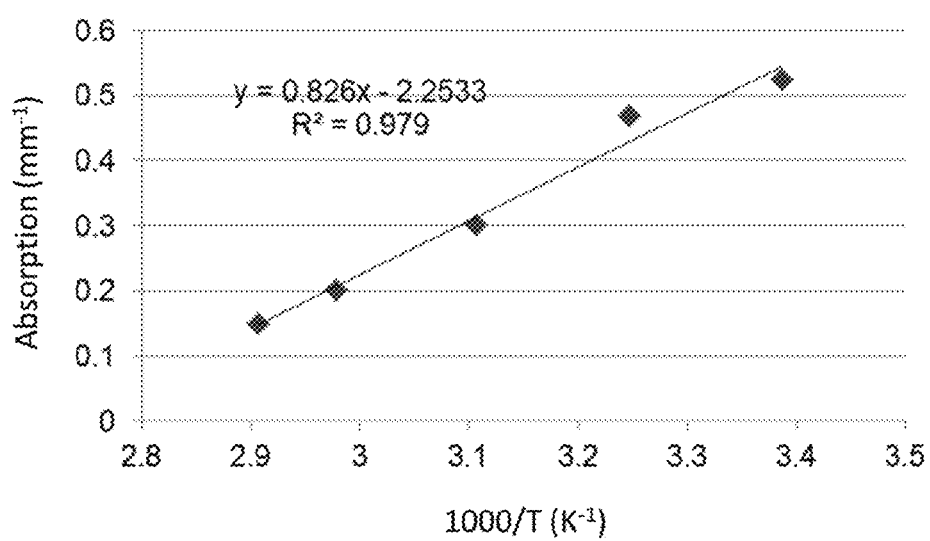
FIG. 9D shows an Arrhenius plot of the absorption associated with the photodarkening response.

FIGS. 9A-9C illustrate the effect of temperature on the photodarkening response of a photochromic glass that contains a cuprous halide nanocrystalline phase with Ag. The glass composition was 54.21 wt % $SiO_2$, 6.88 wt % $Al_2O_3$, 28.73 wt % $B_2O_3$, 7.73 wt % $Na_2O$, 1.14 wt % CuO, 0.10 wt % $SnO_2$, 0.18 $WO_3$ wt %, 0.022 wt % Ag, 0.131 wt % $Cl^-$, and 0.34 wt % The thickness of the glass was 2 mm. The photodarkening response was measured as described hereinabove in connection with FIGS. 3A-3C. FIGS. 9A, 9B, and 9C show the response at 72° F., 122° F., and 160° F., respectively. As temperature increases, the photodarkening response weakens. An Arrhenius plot of the temperature dependence of the absorption (expressed in units of $mm^{-1}$) associated with the photodarkening response as a function of 1000/T (expressed in units of $K^{-1}$) is presented in FIG. 9D. The absorption reported is the absorption after an exposure of the glass to the white light for 5 min. The Arrhenius plot shows a linear dependence on reciprocal temperature, which is consistent with a diffusion-controlled process for the mechanism underlying the photodarkening response.

Figure 10A:
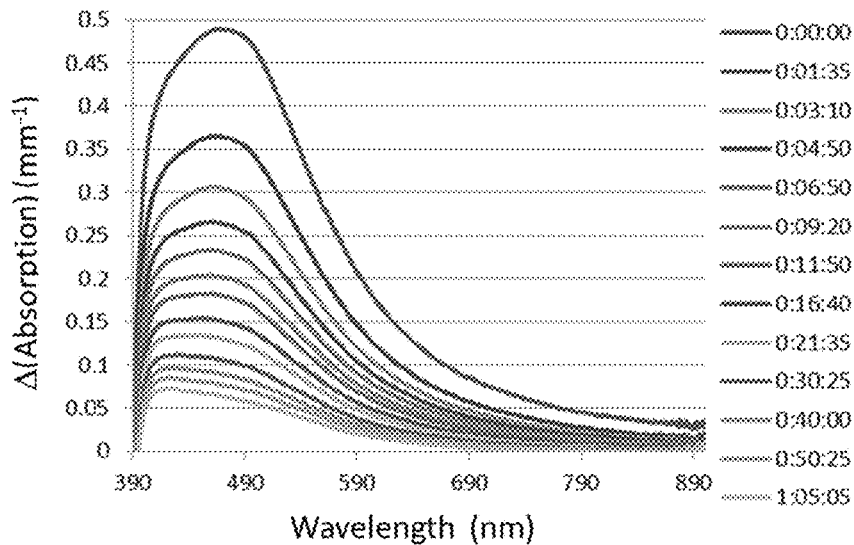
FIGS. 10A and 10B, respectively, depict the fading response of photodarkened glasses with Ag and without Ag in the cuprous halide nanocrystalline phase.
Figure 10B:
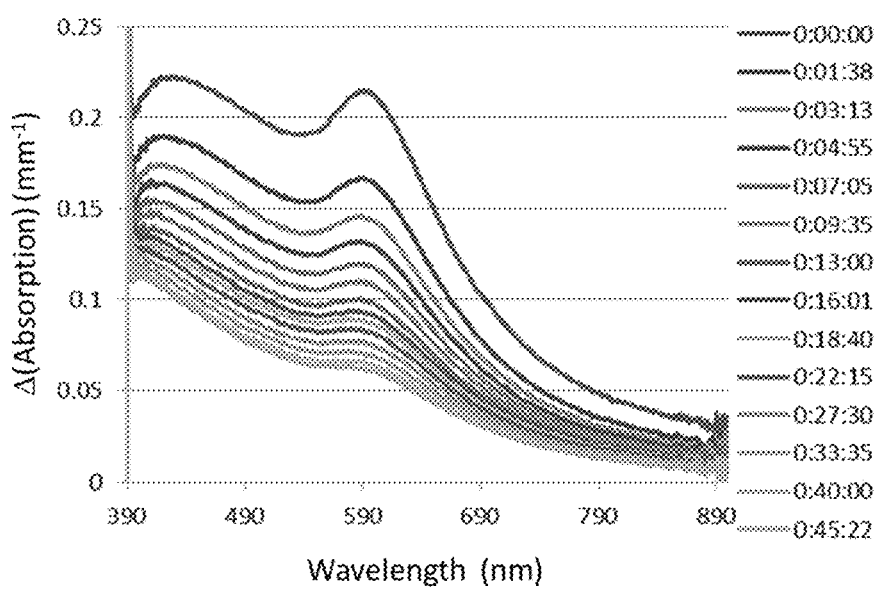

FIGS. 10A and 10B show the differential absorbance spectra associated with photodarkening for glasses having a nanocrystalline cuprous halide phase with and without Ag, respectively. The glass exhibiting the spectra shown in FIG. 10A had the composition 54.22 wt % $SiO_2$, 6.93 wt % $Al_2O_3$, 28.69 wt % $B_2O_3$, 7.76 wt % $Na_2O$, 0.94 wt % CuO, 0.87 wt % $As_2O_3$, 0.021 wt % Ag, 0.235 wt % $Cl^-$, and 0.12 wt % $Br^-$ and the glass exhibiting the spectra shown in FIG. 10B had the composition 54.01 wt % $SiO_2$, 6.90 wt % $Al_2O_3$, 28.66 wt % $B_2O_3$, 7.76 wt % $Na_2O$, 0.97 wt % CuO, 0.80 wt % $As_2O_3$, 0.18 $WO_3$ wt %, 0.242 wt % $Cl^-$, and 0.134 wt % $Br^-$. The thickness of the glass samples was 2 mm.

The absorbance associated with the differential absorbance bands shown in FIGS. 10A and 10B are responsible for the darkening observed in the glass upon exposure to visible light. The glasses were placed in a spectrophotometer and photodarkened by exposing them to a blue laser (405 nm). The glass samples were exposed to the blue laser until a dark spot was evident on the glass. The blue laser was then removed and a series of difference spectra as a function of time, relative to the time of removal of the blue laser, was obtained. The difference spectra show the fading response of the absorption transition associated with photodarkening. The abscissa of the difference spectra shown in FIGS. 10A and 10B, Δ(absorption), corresponds to the change in absorbance of the glass in a photodarkened state relative to the glass in its original (non-photodarkened) state. The difference spectra having maximum intensity in FIGS. 10A and 10B correspond to the difference in absorption of the glasses relative to its non-darkened state in the first measurement scan following removal of the blue laser. The remaining spectra show the fading of the photo-induced absorption as the glass returns to its original non-darkened state. The series of spectra were obtained as consecutive spectral scans following removal of the light source. The times (expressed as hours:minutes:seconds) listed in the legends of—FIGS. 10A and 10B correspond to the start times of the consecutive spectral scans. It is understood that the scans require a finite amount of time and some fading may occur during the scan so that the difference spectra may correspond to an average over the measurement time of the scan. The spectra are ordered (from high intensity to low intensity) in increasing time following removal of the blue laser. As time increases, a greater degree of fading of absorption intensity is observed as the photodarkening response reverses and the glasses return to their original non-darkened state.

A noteworthy feature of the spectra presented in FIGS. 10A and 10B is the difference in the wavelengths of the absorption features for the glass with Ag in the nanocrystalline cuprous halide phase and the glass without Ag in the nanocrystalline cuprous halide phase. The glass without Ag in the nanocrystalline cuprous halide phase (FIG. 10B) exhibits a strong absorption peak near 600 nm that is not apparent in the spectrum of the glass with Ag in the nanocrystalline cuprous halide phase (FIG. 10A). The spectral feature observed near 600 nm is consistent with photoreduction of $Cu^+$ to $Cu^0$ during the photochromic transition to the darkened state and corresponds to a plasmon absorption associated with an aggregated $Cu^0$ nanophase at or near the surface of the cuprous halide nanocrystals. The primary absorption feature of the glass with Ag in the nanocrystalline cuprous halide phase occurs near 500 nm. This feature is consistent with a known plasmon absorption band associated with an aggregated $Ag^0$ nanophase in classical silver halide photochromic glasses. The results indicate that a preferential reduction of Ag occurs upon photoexcitation of Ag-containing cuprous halide nanocrystalline phases. The extinction coefficient of the $Ag^0$ plasmon absorption transition is higher than the extinction coefficient of the $Cu^0$ plasmon absorption transition, which is consistent with the enhanced photodarkening effect noted in FIGS. 8A and 8B.

A photochromic glass with a nanocrystalline cuprous halide phase that contains Ag may have a peak absorption at a wavelength in the range from 390 nm-540 nm, or in the range from 450 nm-530 nm, or in the range from 460 nm-520 nm. A photochromic glass with a nanocrystalline cuprous halide phase that contains Ag and $Cu^{2+}$ may have a peak absorption at a wavelength in the range from 390 nm-540 nm, or in the range from 450 nm-530 nm, or in the range from 460 nm-520 nm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of making a photochromic glass comprising: melting a batch composition, said batch composition including 19 wt %-39 wt % $B_2O_3$, 0.5 wt %-15 wt % $Al_2O_3$, 46 wt %-65 wt % $SiO_2$, 3.5 wt %-12.5 wt % alkali metal oxide, 0.40 wt %-2.5 wt % CuO, 0.01 wt %-1.3 wt % halide, and silver oxide.

2. The method of claim 1, wherein said batch composition includes 22 wt %-35 wt % $B_2O_3$, 1.0 wt %-11 wt % $Al_2O_3$, 50 wt %-61 wt % $SiO_2$, 4.5 wt %-10.5 wt % alkali metal oxide, 0.60 wt %-1.8 wt % CuO, and 0.10 wt %-0.60 wt % halide.

3. The method of claim 1, wherein said halide includes Cl.

4. The method of claim 3, said batch composition includes 0.01 wt %-0.80 wt % of said halide.

5. The method of claim 3, said batch composition includes 0.05 wt %-0.50 wt % of said halide.

6. The method of claim 1, wherein said halide includes Cl and Br.

7. The method of claim 6, wherein said batch composition includes 0.01 wt %-0.60 wt % of said Cl and 0.01 wt %-0.70 wt % of said Br.

8. The method of claim 6, wherein said batch composition includes 0.01 wt %-0.40 wt % of said Cl and 0.01 wt %-0.50 wt % of said Br.

9. The method of claim 1, wherein said batch composition further includes a redox agent.

10. The method of claim 9, wherein said redox agent comprises Sn.

11. The method of claim 10, wherein said batch composition includes up to 0.80 wt % of said redox agent.

12. The method of claim 1, further comprising cooling said batch composition, said cooling occurring after said melting.

13. The method of claim 12, wherein said cooling includes maintaining said batch composition at a temperature in the range from 480° C.-550° C. for at least 1 hour.

14. The method of claim 12, wherein said cooling includes maintaining said batch composition at a temperature in the range from 480° C.-550° C. for at least 4 hours.

15. The method of claim 12, wherein said cooling includes maintaining said batch composition at a temperature in the range from 480° C.-550° C. for at least 8 hours.

16. The method of claim 12, wherein said cooling solidifies said batch composition to form a glass.

17. The method of claim 16, further comprising heating said glass, said heating including maintaining said glass at a temperature in the range from 480° C.-550° C. for a time in the range from 1 min to 24 hour.

18. The method of claim 17, wherein heating includes maintaining said glass at a temperature in the range from 480° C.-550° C. for a time in the range from 1 min-12 hours.

19. The method of claim 17, wherein heating includes maintaining said glass at a temperature in the range from 480° C.-550° C. for a time in the range from 1 hour-10 hours.

20. A method of making a photochromic glass comprising:
melting a batch composition, said batch composition including 19 wt %-39 wt % $B_2O_3$, 0.5 wt %-15 wt % $Al_2O_3$, 46 wt %-65 wt % $SiO_2$, 3.5 wt %-12.5 wt % alkali metal oxide, 0.40 wt %-2.5 wt % CuO, and 0.01 wt %-1.3 wt % halide; and
cooling said batch composition, said cooling occurring after said melting, said cooling includes maintaining said batch composition at a temperature in the range from 480° C.-550° C. for at least 1 hour.

21. The method of claim 20, wherein said batch composition includes 22 wt %-35 wt % $B_2O_3$, 1.0 wt %-11 wt % $Al_2O_3$, 50 wt %-61 wt % $SiO_2$, 4.5 wt %-10.5 wt % alkali metal oxide, 0.60 wt %-1.8 wt % CuO, and 0.10 wt %-0.60 wt % halide.

22. The method of claim 20, wherein said halide includes Cl.

23. The method of claim 22, said batch composition includes 0.01 wt %-0.80 wt % of said halide.

24. The method of claim 22, said batch composition includes 0.05 wt %-0.50 wt % of said halide.

25. The method of claim 20, wherein said halide includes Cl and Br.

26. The method of claim 25, wherein said batch composition includes 0.01 wt %-0.60 wt % of said Cl and 0.01 wt %-0.70 wt % of said Br.

27. The method of claim 25, wherein said batch composition includes 0.01 wt %-0.40 wt % of said Cl and 0.01 wt %-0.50 wt % of said Br.

28. The method of claim 20, wherein said batch composition further includes a redox agent.

29. The method of claim 20, wherein said cooling includes maintaining said batch composition at a temperature in the range from 480° C.-550° C. for at least 4 hours.

30. The method of claim 20, wherein said cooling solidifies said batch composition to form a glass.

31. The method of claim 30, further comprising heating said glass, said heating including maintaining said glass at a temperature in the range from 480° C.-550° C. for a time in the range from 1 min to 24 hour.

\* \* \* \* \*